United States Patent
Li et al.

(10) Patent No.: US 10,911,603 B2
(45) Date of Patent: Feb. 2, 2021

(54) SERVICE ALLOCATION METHOD AND APPARATUS

(71) Applicant: Huawei Technologies Co., Ltd., Shenzhen (CN)

(72) Inventors: Changzhu Li, Shenzhen (CN); Guangxue Sun, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 315 days.

(21) Appl. No.: 15/568,263

(22) PCT Filed: Apr. 22, 2015

(86) PCT No.: PCT/CN2015/077169
§ 371 (c)(1),
(2) Date: Oct. 20, 2017

(87) PCT Pub. No.: WO2016/169002
PCT Pub. Date: Oct. 27, 2016

(65) Prior Publication Data
US 2018/0146373 A1  May 24, 2018

(51) Int. Cl.
*H04W 4/24* (2018.01)
*H04W 12/08* (2009.01)
(Continued)

(52) U.S. Cl.
CPC ............ *H04M 15/41* (2013.01); *H04L 12/14* (2013.01); *H04L 12/1485* (2013.01);
(Continued)

(58) Field of Classification Search
CPC ..... H04W 48/08; H04W 64/00; H04W 12/08; H04W 4/24; H04L 12/14–1485
See application file for complete search history.

(56) References Cited

U.S. PATENT DOCUMENTS 8,392,712 B1 * 3/2013 Wilson ................. H04W 12/06
  713/175
9,179,436 B1 * 11/2015 Dhammawat ....... H04L 61/6059
(Continued)

FOREIGN PATENT DOCUMENTS

CN  101056178 A  10/2007
CN  101448237 A   6/2009
(Continued)

OTHER PUBLICATIONS

"3rd Generation Partnership Project; Technical Specification Group Services and System Aspects; Architecture enhancements for non-3GPP accesses (Release 10)," 3GPP TS 23.402 V10.9.0, pp. 1-232, 3rd Generation Partnership Project, Valbonne, France (Jun. 2014).
(Continued)

*Primary Examiner* — Daniel B Potratz
*Assistant Examiner* — D'Arcy Winston Straub
(74) *Attorney, Agent, or Firm* — Leydig, Voit & Mayer, Ltd.

(57) ABSTRACT

Embodiments of the present invention provide a service allocation method and apparatus. The method includes: firstly, generating, by a core network side device, a first dedicated network identifier according to an association relationship sent by user equipment UE, where the first dedicated network identifier is used to identify the association relationship; secondly, sending, by the core network side device, the first dedicated network identifier to the UE; receiving, by the core network side device, a service request message sent by the UE; and finally, allocating a service to the UE according to the service request message and the first dedicated network identifier. Because each wireless router has a unique first dedicated network identifier, the core network side device can provide, according to the first
(Continued)

dedicated network identifier, a targeted service or tariff policy for UE corresponding to each wireless router.

17 Claims, 3 Drawing Sheets

(51) Int. Cl.
*H04L 12/14* (2006.01)
*H04W 12/06* (2009.01)
*H04W 48/08* (2009.01)
*H04M 15/00* (2006.01)
*H04L 29/06* (2006.01)

(52) U.S. Cl.
CPC ...... *H04L 63/0876* (2013.01); *H04L 63/0892* (2013.01); *H04M 15/61* (2013.01); *H04M 15/62* (2013.01); *H04M 15/66* (2013.01); *H04M 15/68* (2013.01); *H04M 15/8033* (2013.01); *H04W 4/24* (2013.01); *H04W 12/06* (2013.01); *H04W 12/0806* (2019.01); *H04W 48/08* (2013.01)

(56) References Cited

U.S. PATENT DOCUMENTS

| | | | | |
|---|---|---|---|---|
| 9,225,849 | B2* | 12/2015 | Jackson | H04W 48/18 |
| 9,313,661 | B2* | 4/2016 | Eling | H04W 12/0804 |
| 9,538,378 | B2* | 1/2017 | Chen | H04W 4/90 |
| 9,913,164 | B2* | 3/2018 | Rajagopalan | H04L 41/5054 |
| 2009/0113041 | A1 | 4/2009 | Andreazzi | |
| 2009/0176479 | A1* | 7/2009 | Vikberg | H04M 15/85 455/406 |
| 2010/0199332 | A1 | 8/2010 | Bachmann et al. | |
| 2011/0009160 | A1 | 1/2011 | Zhu et al. | |
| 2013/0116008 | A1* | 5/2013 | Delorme | H04W 88/16 455/557 |
| 2013/0223421 | A1 | 8/2013 | Gundavelli et al. | |
| 2014/0011521 | A1 | 1/2014 | Hu | |
| 2016/0006883 | A1* | 1/2016 | Cartmell | H04M 15/58 455/408 |
| 2017/0027007 | A1 | 1/2017 | Roeland | |

FOREIGN PATENT DOCUMENTS

| | | |
|---|---|---|
| CN | 101730074 A | 6/2010 |
| CN | 101784096 A | 7/2010 |
| CN | 102118686 A | 7/2011 |
| CN | 102232305 A | 11/2011 |
| CN | 102388629 A | 3/2012 |
| CN | 103428220 A | 12/2013 |
| CN | 103781182 A | 5/2014 |
| JP | 2015504267 A | 2/2015 |
| WO | 2011110004 A1 | 9/2011 |
| WO | 2014067544 A1 | 5/2014 |
| WO | 2014107527 A1 | 7/2014 |

OTHER PUBLICATIONS

Copeland et al., "Policies to Enable Serving Untrusted Services on Alternative (non-3GPP) and Untrusted Access Networks in EPS," 2011 IEEE Computer Software and Applications Conference Workshops (COMPSACW), IEEE Computer Society, Institute of Electrical and Electronics Engineers, New York, New York (2011).

"3rd Generation Partnership Project; Technical Specification Group Services and System Aspects; Architecture enhancements for non-3GPP accesses(Release 10)," 3GPP TS 23.402 V10.2.1, pp. 1-228, 3rd Generation Partnership Project, Valbonne, France (Jan. 2011).

* cited by examiner

SERVICE ALLOCATION METHOD AND APPARATUS

CROSS-REFERENCE TO RELATED APPLICATIONS

This application is a National Stage Application of International Application No. PCT/CN2015/077169, filed on Apr. 22, 2015, which is hereby incorporated by reference in its entirety

TECHNICAL FIELD

Embodiments of the present invention relate to communications technologies, and in particular, to a service allocation method and apparatus.

BACKGROUND

Currently, a mobile network coverage area provided by a telecommunications operator is limited. To enlarge a network coverage area, convergence of a mobile network and a wireless local area network (WLAN for short) becomes an inevitable trend of the communications industry.

WLANs may be classified into a "trusted network" and an "untrusted network" based on a cooperation relationship between a telecommunications operator and a WLAN provider. Generally, if it is difficult to establish a direct cooperation relationship between a telecommunications operator and a WLAN provider, a WLAN provided by the WLAN provider may be classified into the "untrusted network". An "untrusted network" that has a long-term connection relationship with user equipment (UE for short) is referred to as a "dedicated network". The telecommunications operator may connect a wireless router in a dedicated network to a core network side of a mobile network. In this way, on one hand, the telecommunications operator can view traffic of the dedicated network more clearly; on the other hand, user equipment is enabled to access a service of the core network over the dedicated network.

However, the conventional art has the following problem: A telecommunications operator cannot provide a targeted application service for UE in a dedicated network, and therefore user experience deteriorates.

SUMMARY

Embodiments of the present invention provide a service allocation method and a core network side device, so that a telecommunications operator can provide a targeted application service for UE in a dedicated network, thereby improving user experience.

According to a first aspect, an embodiment of the present invention provides a service allocation method, including: generating, by a core network side device, a first dedicated network identifier according to an association relationship sent by user equipment UE, where the association relationship is an association relationship between the UE and a wireless router, and the first dedicated network identifier is stored in a core network account system, and is used to identify the association relationship; sending, by the core network side device, the first dedicated network identifier to the UE; receiving, by the core network side device, a service request message sent by the UE; and allocating, by the core network side device, a service to the UE according to the service request message and the first dedicated network identifier.

With reference to the first aspect, in a first possible implementation manner of the first aspect, the generating, by a core network side device, a first dedicated network identifier according to an association relationship sent by user equipment UE specifically includes: generating, by the core network side device, the first dedicated network identifier according to a serial number of the wireless router and an identifier of the UE between which the association relationship exists.

With reference to the first possible implementation manner of the first aspect, in a second possible implementation manner of the first aspect, the generating, by the core network side device, the first dedicated network identifier according to a serial number of the wireless router and an identifier of the UE between which the association relationship exists specifically includes: if one wireless router corresponds to multiple UEs, combining, by the core network side device, identifiers of the multiple UEs to generate a combined identifier, and recombining the combined identifier and the serial number of the wireless router.

With reference to the first possible implementation manner of the first aspect, in a third possible implementation manner of the first aspect, the generating, by the core network side device, the first dedicated network identifier according to a serial number of the wireless router and an identifier of the UE between which the association relationship exists specifically includes: combining the serial number of the wireless router and the identifier of the UE in a sequence from a least significant bit to a most significant bit or from a most significant bit to a least significant bit, to generate the first dedicated network identifier.

With reference to the first aspect or the first possible implementation manner or the second possible implementation manner or the third possible implementation manner of the first aspect, in a fourth possible implementation manner of the first aspect, the service request message carries a second dedicated network identifier and a requested service type of the UE; and the allocating, by the core network side device, a service to the UE according to the service request message and the first dedicated network identifier specifically includes: detecting, by the core network side device, whether the second dedicated network identifier is the same as the first dedicated network identifier; if the second dedicated network identifier is the same as the first dedicated network identifier, determining, by the core network side device, a service type corresponding to a wireless router identified by the second dedicated network identifier, and matching the requested service type and the service type corresponding to the wireless router; and if the matching succeeds, allocating, by the core network side device to the UE, a service corresponding to the requested service type.

With reference to the first aspect or the first possible implementation manner or the second possible implementation manner or the third possible implementation manner or the fourth possible implementation manner of the first aspect, in a fifth possible implementation manner of the first aspect, the core network side device is a policy and charging rules function unit PCRF or an Authentication, Authorization, Accounting AAA server.

According to a second aspect, an embodiment of the present invention provides a service allocation apparatus, including: a generation module, configured to generate a first dedicated network identifier according to an association relationship sent by user equipment UE, where the association relationship is an association relationship between the UE and a wireless router, and the first dedicated network identifier is stored in a core network account system, and is used to identify the association relationship; a sending module, configured to send the first dedicated network identifier to the UE; a receiving module, configured to receive a service request message sent by the UE; and an allocation module, configured to allocate a service to the UE according to the service request message and the first dedicated network identifier.

With reference to the second aspect, in a first possible implementation manner of the second aspect, the generation module is specifically configured to generate the first dedicated network identifier according to a serial number of the wireless router and an identifier of the UE between which the association relationship exists.

With reference to the first possible implementation manner of the second aspect, in a second possible implementation manner of the second aspect, the generation module is specifically configured to: if one wireless router corresponds to multiple UEs, combine identifiers of the multiple UEs to generate a combined identifier, and recombine the combined identifier and the serial number of the wireless router.

With reference to the first possible implementation manner of the second aspect, in a third possible implementation manner of the second aspect, the generation module is specifically configured to combine the serial number of the wireless router and the identifier of the UE in a sequence from a least significant bit to a most significant bit or from a most significant bit to a least significant bit, to generate the first dedicated network identifier.

With reference to the second aspect or the first possible implementation manner or the second possible implementation manner or the third possible implementation manner of the second aspect, in a fourth possible implementation manner of the second aspect, the service request message carries a second dedicated network identifier and a requested service type of the UE; and the allocation module is specifically configured to: detect whether the second dedicated network identifier is the same as the first dedicated network identifier; if the second dedicated network identifier is the same as the first dedicated network identifier, determine a service type corresponding to a wireless router identified by the second dedicated network identifier, and match the requested service type and the service type corresponding to the wireless router; and if the matching succeeds, allocate a service corresponding to the requested service type to the UE.

With reference to the second aspect or the first possible implementation manner or the second possible implementation manner or the third possible implementation manner or the fourth possible implementation manner of the second aspect, in a fifth possible implementation manner of the second aspect, a core network side device is a policy and charging rules function unit PCRF or an Authentication, Authorization, Accounting AAA server.

According to a third aspect, an embodiment of the present invention provides a service allocation apparatus, including: a processor, configured to generate a first dedicated network identifier according to an association relationship sent by user equipment UE, where the association relationship is an association relationship between the UE and a wireless router, and the first dedicated network identifier is stored in a core network account system, and is used to identify the association relationship; a transmitter, configured to send the first dedicated network identifier to the UE; and a receiver, configured to receive a service request message sent by the UE, where the processor is further configured to allocate a service to the UE according to the service request message and the first dedicated network identifier.

With reference to the third aspect, in a first possible implementation manner of the third aspect, the processor is specifically configured to generate the first dedicated network identifier according to a serial number of the wireless router and an identifier of the UE between which the association relationship exists.

With reference to the first possible implementation manner of the third aspect, in a second possible implementation manner of the third aspect, the processor is specifically configured to: if one wireless router corresponds to multiple UEs, combine identifiers of the multiple UEs to generate a combined identifier, and recombine the combined identifier and the serial number of the wireless router.

With reference to the first possible implementation manner of the third aspect, in a third possible implementation manner of the third aspect, the processor is specifically configured to combine the serial number of the wireless router and the identifier of the UE in a sequence from a least significant bit to a most significant bit or from a most significant bit to a least significant bit, to generate the first dedicated network identifier.

With reference to the third aspect or the first possible implementation manner or the second possible implementation manner or the third possible implementation manner of the third aspect, in a fourth possible implementation manner of the third aspect, the service request message carries a second dedicated network identifier and a requested service type of the UE; and the processor is specifically configured to: detect whether the second dedicated network identifier is the same as the first dedicated network identifier; if the second dedicated network identifier is the same as the first dedicated network identifier, determine a service type corresponding to a wireless router identified by the second dedicated network identifier, and match the requested service type and the service type corresponding to the wireless router; and if the matching succeeds, allocate a service corresponding to the requested service type to the UE.

With reference to the third aspect or the first possible implementation manner or the second possible implementation manner or the third possible implementation manner or the fourth possible implementation manner of the third aspect, in a fifth possible implementation manner of the third aspect, a core network side device is a policy and charging rules function unit PCRF or an Authentication, Authorization, Accounting AAA server.

Embodiments of the present invention provide a service allocation method and apparatus. The method includes: generating, by a core network side device, a first dedicated network identifier according to an association relationship sent by user equipment UE, where the first dedicated network identifier is stored in a core network account system, and is used to identify the association relationship; sending, by the core network side device, the first dedicated network identifier to the UE; receiving, by the core network side device, a service request message sent by the UE; and finally, allocating a service to the UE according to the service request message and the first dedicated network identifier. In this way, a telecommunications operator can provide a targeted application service and tariff policy for the UE in a dedicated network.

BRIEF DESCRIPTION OF DRAWINGS

To describe the technical solutions in the embodiments of the present invention or in the conventional art more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
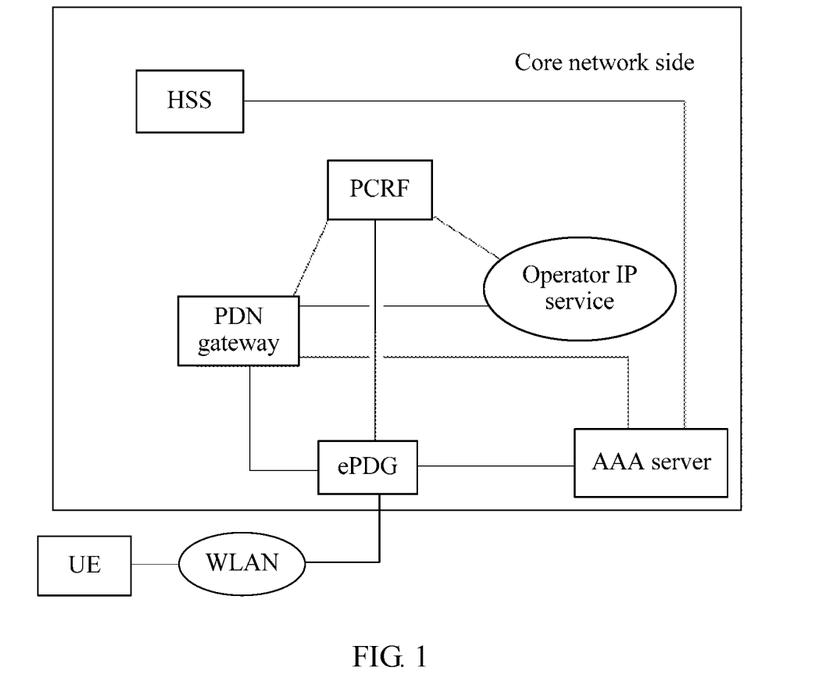
FIG. 1 is a schematic diagram of a network architecture in which a WLAN accesses to a core network side according to the present invention.

FIG. 1 is a schematic diagram of a network architecture in which a WLAN accesses a core network side according to the present invention. As shown in FIG. 1, core network side devices mainly include: a home subscriber server (HSS for short), an Authentication, Authorization, Accounting (AAA for short) server, a packet data network (PDN for short) gateway, an evolved packet data gateway (ePDG for short), a policy and charging rules function unit (PCRF for short), and the like. The HSS is a network user database. It includes a user profile. The HSS executes user identity authentication and authorization, and may provide information related to a user's geographic location. The AAA server is mainly configured to authenticate a user identity and a usable network service, authorize a network service to a user according to the authentication result, record usage of different network services by the user, and provide the recorded usage for a charging system. A network connection server interface that currently cooperates with the AAA server is a Remote Authentication Dial In User Service (RADIUS for short) server. The PDN gateway is configured to provide an interface for connecting to an external packet data network. The PDN gateway implements user data packet filtering, lawful interception, and data packet screening. Moreover, the PDN gateway as a core component of data exchange bears data exchange between a 3rd Generation Partnership Project (3GPP for short) network and a non-3GPP network. A main function of the ePDG is to ensure that an untrusted non-3GPP access network is connected to an evolved core network (EPC for short) for data transmission. The PCRF is mainly configured to control quality of service (QoS for short) of a user and a service, and provide service flow bearer resource guarantee and a charging policy, so as to implement refined service control and charging based on categorized users and services.

Figure 2:
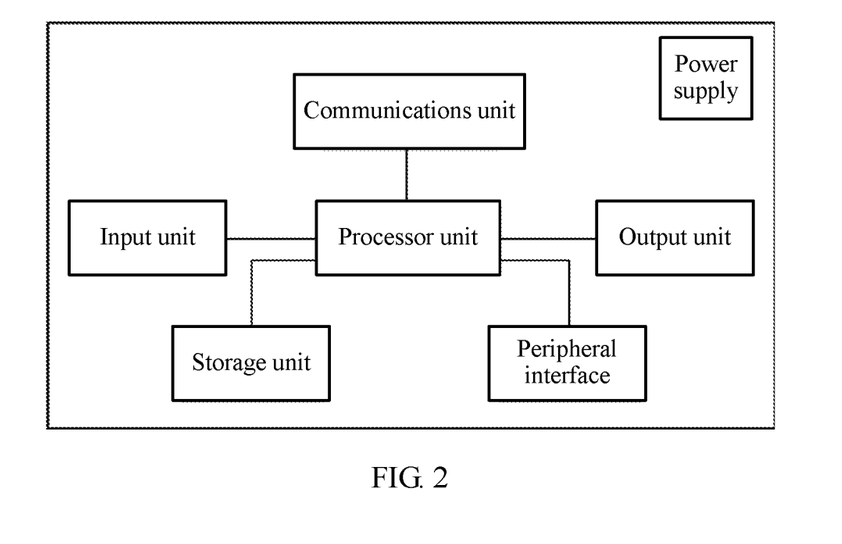
FIG. 2 is a schematic structural diagram of user equipment (UE) according to the present invention.

FIG. 2 is a schematic structural diagram of user equipment UE according to the present invention. As shown in FIG. 2, the user equipment includes components such as an input unit, a storage unit, a processor unit, a communications unit, an output unit, a peripheral interface, and a power supply.

The input unit may be configured to receive an inputted number or character information, and generate key signal input related to user settings and function control of the user equipment.

The storage unit may be configured to store a software program and a module, and the processor unit executes different function applications and data processing of the user equipment by running the software program and the module that are stored in the storage unit.

The communications unit may be a radio frequency (RF) circuit. The RF circuit may be configured to receive and send a signal in an information transceiving process or a call process. Generally, the RF circuit includes but is not limited to an antenna, at least one amplifier, a transceiver, a coupler, a low noise amplifier (LNA), a duplexer, and the like.

The output unit may be configured to display information inputted by a user or information provided for a user, and different menus of the user equipment. The output unit may include a display panel. Optionally, the display panel may be configured in a form of a liquid crystal display (LCD), an organic light-emitting diode (OLED), or the like.

The peripheral interface of the user equipment may be an interface, such as an audio circuit, a loudspeaker, and a microphone. The user equipment further includes a power supply (such as a battery) that supplies power to each part. Preferably, the power supply may be logically connected to the processor unit by using a power management system, so that functions such as charging and discharging management and power consumption management are implemented by using the power management system.

The foregoing components perform communication by using one or more buses. In this embodiment of the present invention, the UE is a mobile or portable electronic device by which the user performs communication with a wireless network system. The UE includes but is not limited to a mobile phone, a mobile computer, a tablet, a personal digital assistant, a combination of the foregoing two or more items, or the like.

Generally, in a WLAN, an "untrusted network" that has a long-term connection relationship with user equipment (UE for short) is referred to as a "dedicated network". The present invention specifically applies to the following scenario: Investment on an access network from a telecommunications operator is reduced due to UE's access to a dedicated network; therefore, the telecommunications operator may provide some targeted services and preferential tariff policies for the UE in the dedicated network, and it is necessary for the telecommunications operator to determine a wireless router and UE that have an association relationship in the dedicated network. Therefore, how to provide a featured service and tariff policy for each user equipment UE in a dedicated network by a telecommunications operator becomes a problem to be resolved.

Figure 3:
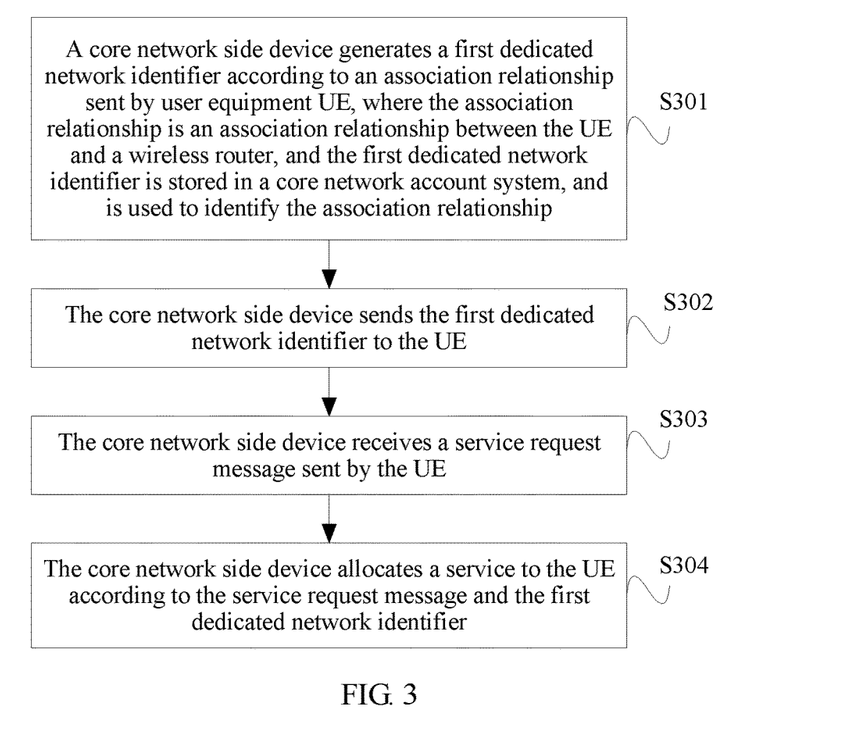
FIG. 3 is a flowchart of a service allocation method according to an embodiment of the present invention.

FIG. 3 is a flowchart of a service allocation method according to an embodiment of the present invention. The method is executed by a core network side device, which may be a policy and charging rules function unit (PCRF for short), an Authentication, Authorization, Accounting (AAA for short) server, or the like on a core network side. A specific process of the service allocation method is as follows.

S301. The core network side device generates a first dedicated network identifier according to an association relationship sent by user equipment UE, where the association relationship is an association relationship between the UE and a wireless router, and the first dedicated network identifier is stored in a core network account system, and is used to identify the association relationship.

Specifically, the wireless router is in a one-to-one correspondence with a dedicated network of the UE. Therefore, the wireless router may also be referred to as a dedicated network device. Certainly, the dedicated network device herein may also be a portable wireless hotspot device and the like. The core network side device and the wireless router herein provide services for the UE respectively in a mobile network and a wireless network. In this embodiment of the present invention, the core network side device generates the first dedicated network identifier according to the association relationship between the UE and the wireless router, and differentiates from different wireless routers and association relationships by using this first dedicated network identifier. Because the first dedicated network identifier is in a one-to-one correspondence with the wireless router, a featured service and tariff policy can be provided for the UE in the corresponding dedicated network according to the first dedicated network identifier of the wireless router.

Further, in a first case, one user may have multiple user equipments UEs that need to access the wireless router, that is, the wireless router and the UEs are in a one-to-many relationship. In a second case, one user equipment UE may access multiple wireless routers, that is, the wireless routers and the UE are in a many-to-one relationship. In a third case, a wireless router and UE are in a one-to-one relationship. After the core network side device receives a "user dedicated network add request message" sent by the user equipment UE, the core network side device generates the first dedicated network identifier in the core network account system.

According to the foregoing three cases, the method for generating the first dedicated network identifier may further be the following three cases:

First case: When a wireless router and UEs are in a one-to-many relationship, because each wireless router corresponds to a unique serial number, the core network side device may collect statistics about UEs that send a same serial number, then combine identifiers of these UEs to generate a combined identifier, and finally re-combine the combined identifier and the serial number of the wireless router. For example, a wireless router with a serial number 1 corresponds to two UEs, and identifiers of the two UEs are respectively their phone numbers: 13000000000 and 13000000001. In this case, a generated combined identifier may be 1300000000013000000001. Finally, the combined identifier and the serial number 1 of the wireless router are re-combined into 13000000000130000000011. Certainly, the method for generating the first dedicated network identifier in this case is not limited herein.

Second case: When wireless routers and UE are in a many-to-one relationship, because a serial number of a wireless router is unique, a first dedicated network identifier corresponding to each wireless router can be generated by combining an identifier of the UE and a serial number of the wireless router, thereby implementing binding of the wireless router and the UE. For example, a serial number of a wireless router and an identifier of the UE are combined in a sequence from a least significant bit to a most significant bit or from a most significant bit to a least significant bit, to generate a first dedicated network identifier. For example, the UE corresponds to three wireless routers, and their serial numbers are respectively 1, 2, and 3. It is assumed herein that the UE is a mobile phone, and the identifier of the UE is a mobile phone number 13000000000. A serial number of a wireless router and the identifier of the UE are combined in the sequence from the least significant bit to the most significant bit. Finally formed first dedicated network identifiers respectively corresponding to the three wireless routers are 130000000001, 130000000002, and 130000000003. Alternatively, a serial number of a wireless router and the identifier of the UE are combined in the sequence from the most significant bit to the least significant bit. Finally formed first dedicated network identifiers respectively corresponding to the three wireless routers are 113000000000, 213000000000, and 313000000000. Certainly, the identifier of the UE herein may also be its corresponding international mobile subscriber identity (IMSI for short).

Third case: A wireless router and UE are in a one-to-one relationship. A generation method similar to the method of the second case may be used, that is, an identifier of the UE and a serial number of the wireless router are combined. For example, the identifier of the UE is 13000000000, and the serial number of the wireless router is 1. Therefore, a generated first dedicated network identifier may be 130000000001, or may be 113000000000.

The foregoing method for generating the first dedicated network identifier is not limited thereto, provided that the following four rules are met:

1. Uniqueness: Each wireless router has a unique first dedicated network identifier. Similarly, the core network side device allocates a first dedicated network identifier to only one wireless router.

2. Associativity: Generation of a first dedicated network identifier needs to be associative with an identifier of UE. An identifier, of UE, associated with a first dedicated network identifier may be derived from the first dedicated network identifier, and a corresponding first dedicated network identifier may be queried in a core network account system according to an identifier of UE.

3. Confidentiality/anti-falsification. Generation of a first dedicated network identifier needs to ensure authenticity of the identifier to prevent the identifier from being tampered or assumed.

4. Maintainability. Operations, such as modify and delete, may be performed on a first dedicated network identifier according to a request message sent by UE.

S302. The core network side device sends the first dedicated network identifier to the UE.

Specifically, because the UE may be in association relationships with multiple wireless routers, or may be in an association relationship with only one wireless router, the UE may correspond to at least one first dedicated network identifier regardless of either of the cases. When the UE sends a service request message to the core network side device, once the core network side device generates a first dedicated network identifier, the core network side device needs to send the identifier to the UE, so that the core network side device learns to which specific wireless router the UE is currently connected.

S303. The core network side device receives a service request message sent by the UE.

S304. The core network side device allocates a service to the UE according to the service request message and the first dedicated network identifier.

Specifically, the core network side device allocates the generated first dedicated network identifier to the corresponding wireless router. The first dedicated network identifier is unique to the wireless router. For example, one UE corresponds to three dedicated networks, and their serial numbers are respectively 1, 2, and 3. A wireless router in each dedicated network corresponds to a unique first dedicated network identifier. Therefore, the core network side device may differentiate the wireless router according to the first dedicated network identifiers, and further allocate a targeted service to the UE corresponding to the wireless router. For example, a tariff policy provided by a core network side device for a voice service of UE in a mobile network is 0.1 yuan per minute. Because the core network side device knows a first dedicated network identifier of a wireless router, the core network side device may provide a tariff policy 0.03 yuan per minute of a voice service for the UE in a dedicated network according to the first dedicated network identifier. Certainly, the core network side device allocates a service to the UE with reference to a service request message and the first dedicated network identifier. With reference to the service request message, two items may be detected: 1. whether the UE is a valid UE, that is, whether the UE is in an association relationship with the wireless device; 2. even if the UE is valid, the core network side device may not be capable of providing a service requested by the UE for the UE.

This embodiment of the present invention provides a service allocation method. The method includes: generating, by a core network side device, a first dedicated network identifier according to an association relationship sent by user equipment UE, where the first dedicated network identifier is stored in a core network account system, and is used to identify the association relationship; sending, by the core network side device, the first dedicated network identifier to the UE; receiving, by the core network side device, a service request message sent by the UE; and finally, allocating a service to the UE according to the service request message and the first dedicated network identifier. Because each wireless router has a unique first dedicated network identifier, the core network side device can provide, according to the first dedicated network identifier, a targeted service or tariff policy for UE corresponding to each wireless router.

Figure 4:
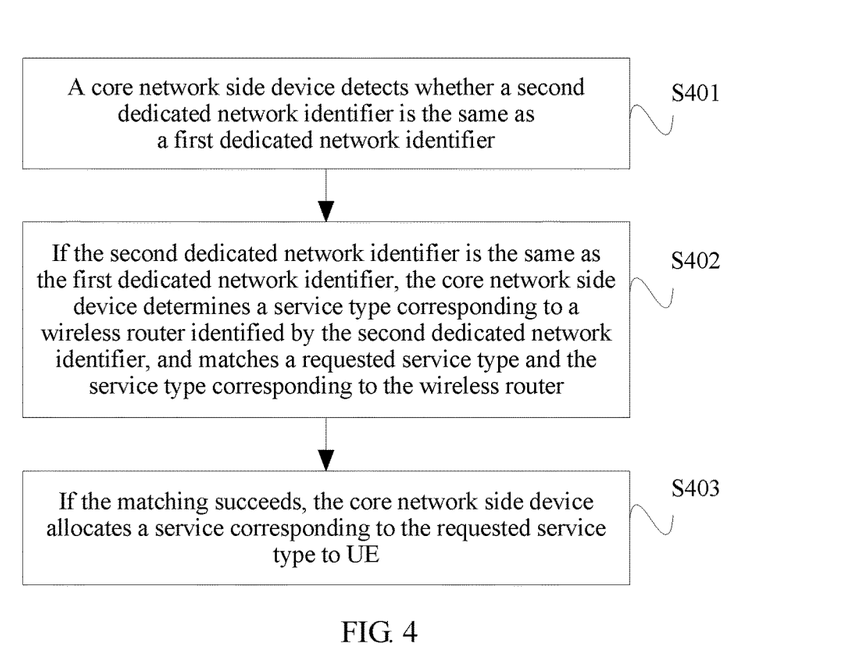
FIG. 4 is a flowchart of a service allocation method according to another embodiment of the present invention.

FIG. 4 is a flowchart of a service allocation method according to another embodiment of the present invention. This embodiment further details step S304 in the previous embodiment. The service request message carries a second dedicated network identifier and a requested service type of the UE. Therefore, the method specifically includes the following procedures.

S401. The core network side device detects whether the second dedicated network identifier is the same as the first dedicated network identifier.

Specifically, a dedicated network identifier sent by the UE is referred to as the second dedicated network identifier herein. The second dedicated network identifier and the first dedicated network identifier may be the same, or may be different. In addition, before sending the second dedicated network identifier, the UE first accesses a dedicated network, and then, the UE and a core network side need to establish a virtual private network (VPN for short) connection that is based on Internet Protocol Security (IPSec for short). A method for accessing the dedicated network by the UE may be any existing method in the conventional art. This is not limited in the present invention. For example, generally, for system security improvement, a wireless router requires a user to input various types of user authentication information in a further connection process, or guides a user to start a web browser to enter a specific web page to perform a further authentication operation. After these authentication operations are completed, connection of the UE to a local WiFi network is completed, and a next operation may further be performed. To ensure security and reliability of communication between the UE and the core network side device, the virtual private network (VPN for short) connection based on Internet Protocol Security (IPSec for short) needs to be established on the basis of a dedicated network connection bearer. A main function of an evolved packet data gateway (ePDG for short) device on the core network side of a telecommunications operator is to maintain such a connection that implements remote private access by using a mobile network. The IPSec encapsulates an original data packet inside a new data packet to form a transmission channel. The new data packet may have new addressing and routing information, so that the new data packet can be transmitted by using the mobile network.

After the UE establishes the VPN connection, the UE transmits the second dedicated network identifier to the core network side device by using the VPN connection, so that the core network side device detects the second dedicated network identifier.

S402. If the second dedicated network identifier is the same as the first dedicated network identifier, the core network side device determines a service type corresponding to a wireless router identified by the second dedicated network identifier, and matches the requested service type and the service type corresponding to the wireless router.

S403. If the matching succeeds, the core network side device allocates a service corresponding to the requested service type to the UE.

Specifically, after generating the first dedicated network identifier, the core network side device generally stores the first dedicated network identifier in a core network account system. The core network account system may be a database in the core network side device, and may be in table form. Therefore, a table corresponding to each core network side device includes: all first dedicated network identifiers stored by the core network side device. When the core network side device checks or matches the second dedicated network identifier and the first dedicated network identifier in the table, if it is found that the received second dedicated network identifier and the first dedicated network identifier are the same, it indicates that the wireless router corresponding to the second dedicated network identifier is valid to the core network side device; conversely, if it is found that the received second dedicated network identifier does not exists in the table, it indicates that the wireless router corresponding to the second dedicated network identifier is invalid to the core network side device. Once the core network side device determines that a wireless router W corresponding to the second dedicated network identifier is valid, the core network side device continues to determine a service type corresponding to the wireless router identified by the second dedicated network identifier, and matches the requested service type and the service type corresponding to the wireless router. If the matching succeeds, the core network side device allocates a service corresponding to the requested service type to the UE.

It should be noted that, when the UE does not send any identifier to the core network side device or the core network side device does not receive the identifier sent by the UE, the core network side device only enables the UE to access the core network, but cannot provide a targeted service for the UE.

The targeted service in the present invention may be featured streaming media music, or a video service, or some preferential tariff policies, or the like.

This embodiment of the present invention provides a service allocation method, including: detecting, by a core network side device, whether a second dedicated network identifier is the same as a first dedicated network identifier; if the second dedicated network identifier is the same as the first dedicated network identifier, determining a service type corresponding to a wireless router identified by the second dedicated network identifier, and matching a requested service type with the service type corresponding to the wireless router; if the matching succeeds, allocating, by the core network side device, a service corresponding to the requested service type to UE. Because the core network side device may perform validity detection on the second dedicated network identifier, reliability and security of a communications network can be improved.

It should be noted that, when an association relationship between UE and a wireless router ends, the UE may send, to a core network side device, a request for deleting a first dedicated network identifier of the wireless router. Then the core network side device searches a core network account system for the first dedicated network identifier, and deletes the first dedicated network identifier. Certainly, the core network side device may further perform operations, such as add or delete, on the first dedicated network identifier.

Figure 5:
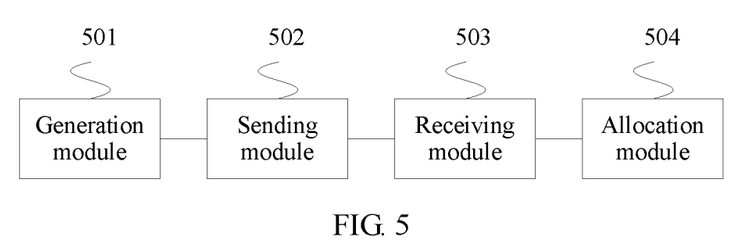
FIG. 5 is a schematic structural diagram of a service allocation apparatus according to an embodiment of the present invention.

FIG. 5 is a schematic structural diagram of a service allocation apparatus according to an embodiment of the present invention. The apparatus may be a policy and charging rules function unit (PCRF for short), an Authentication, Authorization, Accounting (AAA for short) server, or the like on a core network side. The apparatus includes: a generation module 501, configured to generate a first dedicated network identifier according to an association relationship sent by user equipment UE, where the association relationship is an association relationship between the UE and a wireless router, and the first dedicated network identifier is stored in a core network account system, and is used to identify the association relationship; a sending module 502, configured to send the first dedicated network identifier to the UE; a receiving module 503, configured to receive a service request message sent by the UE; and an allocation module 504, configured to allocate a service to the UE according to the service request message and the first dedicated network identifier.

The generation module 501 is specifically configured to generate the first dedicated network identifier according to a serial number of the wireless router and an identifier of the UE between which the association relationship exists.

In an optional manner, the generation module 501 is specifically configured to: if one wireless router corresponds to multiple UEs, combine identifiers of the multiple UEs to generate a combined identifier, and recombine the combined identifier and the serial number of the wireless router.

In another optional manner, the generation module 501 is specifically configured to combine the serial number of the wireless router and the identifier of the UE in a sequence from a least significant bit to a most significant bit or from a most significant bit to a least significant bit, to generate the first dedicated network identifier.

This embodiment of the present invention provides a service allocation apparatus. The service allocation apparatus may be configured to execute a technical implementation scheme of the service allocation method corresponding to FIG. 3. Implementation principles and technical effects thereof are similar, and details are not described herein.

Optionally, based on the previous embodiment, the service request message carries a second dedicated network identifier and a requested service type of the UE. Referring to FIG. 5, the allocation module 504 is specifically configured to detect whether the second dedicated network identifier is the same as the first dedicated network identifier; if the second dedicated network identifier is the same as the first dedicated network identifier, determine a service type corresponding to a wireless router identified by the second dedicated network identifier, and match the requested service type and the service type corresponding to the wireless router; and if matching succeeds, allocate a service corresponding to the requested service type to the UE.

Because the service allocation apparatus may perform validity detection on the second dedicated network identifier, reliability and security of a communications network can be improved.

Figure 6:
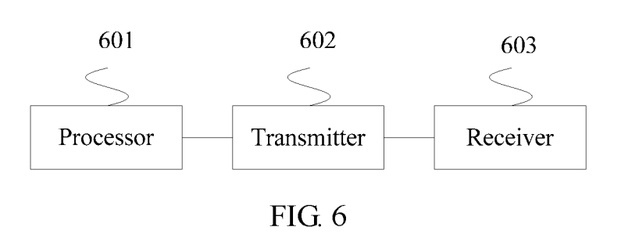
FIG. 6 is a schematic structural diagram of a service allocation apparatus according to another embodiment of the present invention.

FIG. 6 is a schematic structural diagram of a service allocation apparatus according to another embodiment of the present invention. The apparatus may be a policy and charging rules function unit (PCRF for short), an Authentication, Authorization, Accounting (AAA for short) server, or the like on a core network side. The apparatus includes: a processor 601, configured to generate a first dedicated network identifier according to an association relationship sent by user equipment UE, where the association relationship is an association relationship between the UE and a wireless router, and the first dedicated network identifier is stored in a core network account system, and is used to identify the association relationship; a transmitter 602, configured to send the first dedicated network identifier to the UE; and a receiver 603 is configured to receive a service request message sent by the UE, where the processor 601 is further configured to allocate a service to the UE according to the service request message and the first dedicated network identifier.

Further, the processor 601 is specifically configured to generate the first dedicated network identifier according to a serial number of the wireless router and an identifier of the UE between which the association relationship exists.

In an optional manner, the processor 601 is specifically configured to: if one wireless router corresponds to multiple UEs, combine identifiers of the multiple UEs to generate a combined identifier, and recombine the combined identifier and the serial number of the wireless router.

In another optional manner, the processor 601 is specifically configured to combine the serial number of the wireless router and the identifier of the UE in a sequence from a least significant bit to a most significant bit or from a most significant bit to a least significant bit, to generate the first dedicated network identifier.

This embodiment of the present invention provides a service allocation apparatus. The service allocation apparatus may be configured to execute a technical implementation scheme of the service allocation method corresponding to FIG. 3. Implementation principles and technical effects thereof are similar, and details are not described herein.

Further, the service request message carries a second dedicated network identifier and a requested service type of the UE. The processor 601 is specifically configured to detect whether the second dedicated network identifier is the same as the first dedicated network identifier; if the second dedicated network identifier is the same as the first dedicated network identifier, determine a service type corresponding to a wireless router identified by the second dedicated network identifier, and match the requested service type and the service type corresponding to the wireless router; and if matching succeeds, allocate a service corresponding to the requested service type to the UE.

Because the service allocation apparatus may perform validity detection on the second dedicated network identifier, reliability and security of a communications network can be improved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A service allocation method, comprising:
   generating, by a core network side device, a first dedicated network identifier according to an association relationship sent by user equipment (UE), wherein the association relationship comprises an association relationship between the UE and a wireless router, the first dedicated network identifier including at least a concatenation of a unique identifier of the UE and a unique identifier of the wireless router, and the first dedicated network identifier is stored in a core network account system, and is used to identify the association relationship;
   sending, by the core network side device, the first dedicated network identifier to the UE;
   receiving, by the core network side device, a service request message sent by the UE;
   allocating, by the core network side device, a service to the UE according to the service request message and the first dedicated network identifier; and
   applying, by the core network side device, a tariff policy based on the first dedicated network identifier, wherein the tariff policy comprises at least applying a first rate when the UE accesses a requested service type through a mobile network and applying a second rate when the UE accesses the requested service type through a dedicated network, and wherein the first rate is different from the second rate.

2. The method according to claim 1, wherein the generating the first dedicated network identifier comprises:
   generating, by the core network side device, the first dedicated network identifier according to a serial number of the wireless router and an identifier of the UE.

3. The method according to claim 2, wherein the generating the first dedicated network identifier according to the serial number of the wireless router and the identifier of the UE comprises:
   combining, by the core network side device, identifiers of the multiple UEs to generate a combined identifier, and combining the combined identifier and the serial number of the wireless router.

4. The method according to claim 2, wherein the generating the first dedicated network identifier according to the serial number of the wireless router and the identifier of the UE comprises:
   combining the serial number of the wireless router and the identifier of the UE in a sequence from a least significant bit to a most significant bit or from the most significant bit to the least significant bit, to generate the first dedicated network identifier.

5. The method according to claim 1, wherein the service request message carries a second dedicated network identifier and a requested service type of the UE; and
   wherein the allocating, by the core network side device the service to the UE according to the service request message and the first dedicated network identifier comprises:
   detecting, by the core network side device, whether the second dedicated network identifier is the same as the first dedicated network identifier;
   in response to the second dedicated network identifier being the same as the first dedicated network identifier, determining, by the core network side device, a service type corresponding to the wireless router identified by the second dedicated network identifier, and matching the requested service type and the service type corresponding to the wireless router; and
   in response to the matching succeeding, allocating, by the core network side device to the UE, a service corresponding to the requested service type.

6. The method according to claim 1, wherein the core network side device is a policy and charging rules function (PCRF) unit or an Authentication, Authorization, Accounting (AAA) server.

7. The method according to claim 1, wherein the service further comprises at least one of media music and video service.

8. A service allocation apparatus, comprising:
   a processor, configured to generate a first dedicated network identifier according to an association relationship sent by user equipment (UE), wherein the association relationship comprises an association relationship between the UE and a wireless router, the first dedicated network identifier including at least a concatenation of a unique identifier of the UE and a unique identifier of the wireless router, and the first dedicated network identifier is stored in a core network account system, and is used to identify the association relationship;
   a transmitter, configured to send the first dedicated network identifier to the UE; and
   a receiver, configured to receive a service request message sent by the UE,
   wherein the processor is further configured to allocate a service to the UE according to the service request message and the first dedicated network identifier, and to apply a tariff policy based on the first dedicated network identifier, wherein the tariff policy comprises a first rate when the UE accesses a requested service type through a mobile network and a second rate when the UE accesses the requested service type through a dedicated network, and wherein the first rate is different from the second rate.

9. The apparatus according to claim 8, wherein the processor is configured to:
   generate the first dedicated network identifier according to a serial number of the wireless router and an identifier of the UE.

10. The apparatus according to claim 9, wherein the processor is configured to:
combine identifiers of the multiple UEs to generate a combined identifier, and combine the combined identifier and the serial number of the wireless router.

11. The apparatus according to claim 9, wherein the processor is configured to:
combine the serial number of the wireless router and the identifier of the UE in a sequence from a least significant bit to a most significant bit or from the most significant bit to the least significant bit, to generate the first dedicated network identifier.

12. The apparatus according to claim 8, wherein the service request message carries a second dedicated network identifier and a requested service type of the UE; and
the processor is configured to:
detect whether the second dedicated network identifier is the same as the first dedicated network identifier;
in response to the second dedicated network identifier being the same as the first dedicated network identifier, determine a service type corresponding to the wireless router identified by the second dedicated network identifier, and match the requested service type and the service type corresponding to the wireless router; and
in response to the matching succeeding, allocate a service corresponding to the requested service type to the UE.

13. The apparatus according to claim 8, wherein a core network side device is a policy and charging rules function (PCRF) unit or an Authentication, Authorization, Accounting (AAA) server.

14. The apparatus according to claim 8, wherein the service further comprises at least one of media music and video service.

15. A non-transitory machine readable storage medium having stored thereon processor executable instructions which, when executed by a processor, cause the processor to perform a service allocation method, comprising:
generating a first dedicated network identifier according to an association relationship sent by user equipment (UE), wherein the association relationship comprises an association relationship between the UE and a wireless router, the first dedicated network identifier including at least a concatenation of a unique identifier of the UE and a unique identifier of the wireless router, and the first dedicated network identifier is stored in a core network account system, and is used to identify the association relationship;
sending the first dedicated network identifier to the UE;
receiving a service request message sent by the UE;
allocating a service to the UE according to the service request message and the first dedicated network identifier; and
applying a tariff policy based on the first dedicated network identifier, wherein the tariff policy comprises at least applying a first rate when the UE accesses a requested service type through a mobile network and applying a second rate when the UE accesses the requested service type through a dedicated network, and wherein the first rate is different from the second rate.

16. The non-transitory machine readable storage medium of claim 15, wherein the service request message carries a second dedicated network identifier and a requested service type of the UE; and
wherein the allocating, by the core network side device the service to the UE according to the service request message and the first dedicated network identifier comprises:
detecting, by the core network side device, whether the second dedicated network identifier is the same as the first dedicated network identifier;
in response to the second dedicated network identifier being the same as the first dedicated network identifier, determining, by the core network side device, a service type corresponding to the wireless router identified by the second dedicated network identifier, and matching the requested service type and the service type corresponding to the wireless router; and
in response to the matching succeeding, allocating, by the core network side device to the UE, a service corresponding to the requested service type.

17. The non-transitory machine readable storage medium of claim 15, wherein the service further comprises at least one of media music and video service.

* * * * *